United States Patent Office 3,707,387
Patented Dec. 26, 1972

3,707,387
AIR-CURING RESIN COMPOSITION
Satoru Enomoto, Hisayuki Wada, Mikio Fujioka, and Masao Koguro, Iwaki, Japan, assignors to Kureha Kagaku Kogyo Kabushiki Kaisha, Tokyo-to, Japan
No Drawing. Filed Nov. 20, 1970, Ser. No. 91,601
Claims priority, application Japan, Nov. 20, 1969, 44/92,649
Int. Cl. C08h 17/28
U.S. Cl. 106—265                                6 Claims

ABSTRACT OF THE DISCLOSURE

Air-curing resin composition comprising a mixture of 100 parts by weight of an air-curing resin selected from drying oil or an oil-modified alkyd resin, and from 5 to 250 parts by weight of a propylated polycyclic aromatic compound obtained by introducing from 1 to 5 propyl groups on the average per molecule of a polycyclic aromatic compound of an average molecular weight of 200 to 600 is disclosed. The resin composition gives rise to a cured product having improved water resistance and is suitably used as paints, varnishes and like coating materials and sealants.

BACKGROUND OF THE INVENTION (1) Field of the invention

This invention relates to an air-curing resin composition.

(2) Description of the prior art

An air-curing resin, such as drying oils or oil-modified alkyd resins, have hitherto been extensively used as paints, varnishes or like coating materials and sealants because of their cheapness and good workability, rapid curing properties, adhesiveness and weather resistant properties. However, such resins are inferior in water resistance characteristics and unsatisfactory in light resistance.

It is, therefore, an object of the present invention to provide an air-curing resinous composition free from the disadvantages described above.

SUMMARY OF THE INVENTION

The present invention is based on the discovery that an air-curing resin can be improved in its water resisting characteristics without any sacrifice in its other advantageous properties by incorporation therein of a specified fraction of a propylated polycyclic aromatic hydrocarbon. The propylated polycyclic aromatic hydrocarbon can be obtained by propylating a polycyclic aromatic hydrocarbon composed of carbon and hydrogen and having an average molecular weight of from 200 to 600. The phenomenon of "bleeding" is not observed on the cured product of the resulting composition. This is surprising considering that aromatic oily substances have, hitherto, been used very little for the purpose of improving such air-curing resins in their water resisting properties because of the disadvantage of "bleeding." It is believed that in the resin composition of the present invention the propylated polycyclic aromatic compound reacts with the resin during curing.

DETAILED DESCRIPTION OF THE INVENTION

Speaking in greater detail with respect to the polycyclic aromatic compound of the composition of the present invention, it is the fraction having a boiling range of from 250 to 600° C. of the propylation product of a polycyclic aromatic compound having an average molecular weight, as measured using vapor pressure-osmometry (hereinafter referred to as "VPO"), of from 200 to 600. The propylation product contains at least 1, preferably from 2 to 5 propyl groups, on the average per molecule. Where a composition of a high viscosity is needed, there preferably is used a fraction having a boiling range of from 350 to 600° C. The calculation of the propyl groups introduced into the polycyclic aromatic compound is made by analysis of the nuclear magnetic resonance absorption spectrum (hereinafter referred to as "NMR") of the starting material and of the product.

On propylation, surprisingly, polycyclic aromatic compounds, which generally are black to dark brown in color, are discolored to a Gardner number of from 2 to 9. On propylation there was observed no formation and pecipitation of cystals or like solids. In addition, the propylation product contained no nitrogen, sulfur and oxygen based on the results obtained on an elementary analysis and had no offensive odor which might be an obstacle to its use.

The polycyclic aromatic compound used as a starting material in the preparation of the additive of the present invention includes liquid products obtained by the heat treatment at a high temperature of greater than 500° C. of a petroleum hydrocarbon or a petroleum hydrocarbon fraction, such as, for example, crude oil, heavy oil, light oil, kerosene, benzine, naphtha, liquified natural gas, liquified petroleum gas and the like. That is to say, according to the present invention an additive having an excellent effect is obtained using as the starting material a substance which has hitherto been considered to be of low economic value, such as residual oil in the manufacture of acetylene or acetylene and ethylene, bottom oil in the so-called naphtha cracking for ethylene cracking, oil tars in the manufacture of town gas, residual oil in coker, residual oil in bisbreaker, cycle oil in catalytic cracking or residual oil in dealkylation.

The propylation can be carried out using a conventional alkylation catalyst, apparatus and process. On the propylation, it is exceedingly preferred for the life and effect of the catalyst to subject the reactants to desulfurization in a conventional manner. For the propylation to proceed smoothly it is preferred that the polycyclic aromatic compound used as starting material have a minimum amount of side chains. Therefore, especially preferred starting materials are polycyclic compounds obtained by heat treatment at temperatures above 700° C.

The additive of the present invention thus obtained has the general properties shown as follows:

| | |
|---|---|
| Molecular weight (VPO) | 240–600 |
| Boiling range (° C.) | 250–600 |
| Specific gravity ($d_4^{20}$) | 0.9–1.1 |
| Viscosity (cp.) (at 20° C.) | 3,000–50,000 |
| Concentration of protons in the aromatic ring (NMR) (percent) | 15–30 |
| Propylation degree (per molecule) | 1–5 |
| Gardner color number | 2–9 | and can be suitably prepared depending upon its uses and applications.

The air-curing resin for use in the present invention is selected from drying oils or oil-modified alkyd resins. They are, for example, linseed oil, tung oil, soybean oil, castor oil, palm oil and like natural oils and fats, and oils derived from natural oils, for example, tall oil, boiled oil and like artificially derived oils; various modified alkyd resins; oil modified liquid-type epoxy resins; unsaturated polyester resins; and compounds having many unsaturated bonds in the molecule synthesized by the polymerization of a vinyl compound such as isoprene or cyclopentadiene. Coatings, sealants and other compositions comprising a mixture of 100 parts, by weight, of such a resin and from 5 to 250 parts by weight of an additive of the present invention have a markedly improved water resistance characteristic and excellent light resistance in the cured state.

The composition of the present invention can be incorporated with a curing agent, for example, a metal salt of naphthanic acid and other conventional additives, such as, for example, solvents, plasticizers, antioxidants, fillers and pigments, where desired.

The composition of the present invention can be advantageously used especially as coatings and sealants in view of the characteristics described above.

The present invention is illustrated in greater detail by the following examples.

PREPARATION EXAMPLE 1

A liquid having a boiling range of from 250–450° C. and an average molecular weight by VPO of 320, obtained in the manufacture of acetylene and ethylene by the cracking of a crude oil from North Sumatra in a high temperature steam at 2,000° C., was passed for desulfurization through a reaction tube packed with a cobalt-molybdenum-alumina catalyst at 390° C. under a pressure of 35 kg./cm.$^2$, at a liquid space hourly velocity of 0.5 and in a molar ratio of hydrogen to the oil of 6. The product was then mixed with propylene in an amount of 9 moles per mole of the product and introduced into a reaction tube packed with a silica-alumina catalyst to effect propylation at 200° C., under a pressure of 10 kg./cm.$^2$ and at a liquid space hourly velocity of 0.5. The propylated product was distilled to obtain fractions A and B having the properties as summarized in the following Table 1.

TABLE 1

| Fraction | A | B |
|---|---|---|
| Boiling range (° C.) | 350–400 | 350–450 |
| Specific gravity ($d_4^{20}$) | 1.01 | 1.03 |
| Viscosity (c.p.s.) (at 20° C.) | 4,000 | 15,000 |
| Molecular weight (VPO) | 250 | 270 |
| Concentration of aromatic ring-forming protons (NMR) | 22.1 | 18.7 |
| Propylation degree (per molecule) | 2.5 | 2.8 |
| Gardner color number | 2 | 4 |
| Elementary analysis, percent weight: | | |
| S | 0 | 0 |
| N | 0 | 0 |
| O | 0 | 0 |

PREPARATION EXAMPLE 2

A fraction having a boiling range of from 250–450° C. from a bottom oil in the manufacture of ethylene by the externally heated steam cracking of a Mid-East naphtha was subjected to desulfurization and alkylation in the same manner as in Preparation Example 1, and the product was distilled into fraction C and D having the properties as summarized in the following Table 2.

TABLE 2

| Fraction | C | D |
|---|---|---|
| Boiling range (° C.) | 350–400 | 350–450 |
| Specific gravity ($d_4^{20}$) | 1.01 | 1.03 |
| Viscosity (c.p.s.) (at 20° C.) | 5,500 | 21,000 |
| Molecular weight (VPO) | 250 | 270 |
| Concentration of aromatic ring-forming protons (NMR) | 15.2 | 17.1 |
| Propylation degree (per molecule) | 3.2 | 4.8 |
| Gardner color number | 3 | 5 |
| Elementary analysis, percent weight: | | |
| S | 0 | 0 |
| N | 0 | 0 |
| O | 0 | 0 |

Example 1

To 100 parts by weight of oil modified alkyd resin (Phthalkyd 265–100: soy-bean oil modified, oil length 65, phthalic acid 24% wt., resin-content 100% wt., supplied by Hitachi Kasei Co., Ltd., in Japan) were added 50 parts by weight of a white mineral oil, 0.5 part by weight of cobalt naphthenate as a curing agent and the amount, as listed in the following Table 3, of fractions A, B, C and D prepared in the above Preparations Examples 1 and 2. The resulting mixture was applied in a thickness of from 30–50 microns to a coating base and the time for setting to the touch was measured. The coating film was, after air-drying at room temperature for one week, subjected to water resistance testing and weathering testing under the conditions as indicated in the following Table 3. The test results obtained are also summarized in Table 3.

TABLE 3

| Additive | Amounts added (parts by weight) | Set to the touch at 20° C. (hrs.) | Water resistance in boiling water for 60 minutes | Fadeometer test for 200 hours |
|---|---|---|---|---|
| A | 10 | 10 | Blistered in 30 min | Unchanged. |
| A | 50 | 10 | Unchanged | Do. |
| A | 100 | 12 | do | Do. |
| A | 150 | 15 | do | Do. |
| A | 200 | 20 | do | Do. |
| B | 10 | 10 | Blistered in 40 min | Do. |
| B | 50 | 10 | Unchanged | Do. |
| B | 100 | 12 | do | Do. |
| B | 150 | 15 | do | Do. |
| B | 200 | 18 | do | Do. |
| C | 10 | 10 | Blistered in 35 min | Do. |
| C | 40 | 10 | Unchanged | Do. |
| C | 100 | 12 | do | Do. |
| C | 150 | 15 | do | Do. |
| C | 200 | 20 | do | Do. |
| D | 10 | 10 | Blistered in 35 min | Do. |
| D | 40 | 10 | Unchanged | Do. |
| D | 100 | 12 | do | Do. |
| D | 150 | 15 | do | Do. |
| D | 200 | 20 | do | Do. |
| Control | | | Blistered in 3 min | |

The results shown in Table 3 above clearly demonstrate that the composition of the present invention gives a cured coating film having improved water resisting characteristics in comparison with prior products. The coating films prepared in accordance with the present invention all withstood the bending testing (using an ⅛ inch mandrel) and adhesion testing.

Example 2

To 143 parts by weight of oil modified alkyd resin (Phthalkyd 365–70: linseed oil modified, oil length 75, phthalic acid 24% wt., resin-content 70% wt., supplied by Hitachi Kasei Co., Ltd. in Japan) were added 0.5 part by weight of cobalt naphthenate as a curing agent, and the amount, as listed in the following Table 4, of fractions A, B, C and D prepared in the above Preparation Examples 1 and 2.

The above resulting mixture was applied in a thickness of from 30–50 microns to a coating base.

The coating film was, after air-drying at room temperature for one week, subjected to the following test as shown in Table 4. The test results obtained are also summarized in Table 4.

The results shown in Table 4 below demonstrate clearly that the composition of the present invention excels prior products in respect to water resistance and also the present composition is improved in impact strength.

TABLE 4

| Additive | Amounts added (parts by weight) | Erichsen test (mm.) | Mandrel test (mm.) | Pencil hardness (H) | Impact strength (Dupont type) | Adhesiveness | Water resistance in boiling water (min.) |
|---|---|---|---|---|---|---|---|
| A | 50 | 10.2 | 2 | 2 | 1 kg–50 cm | 100/100 | 80 |
| A | 100 | 10.8 | 2 | 2 | 1 kg–50 cm | 100/100 | 130 |
| B | 50 | 10.3 | 2 | 2 | 1 kg–50 cm | 100/100 | 70 |
| B | 100 | 10.9 | 2 | 2 | 1 kg–50 cm | 100/100 | 130 |
| C | 50 | 10.1 | 2 | 2 | 1 kg–50 cm | 100/100 | 70 |
| C | 100 | 10.8 | 2 | 2 | 1 kg–50 cm | 100/100 | 140 |
| D | 50 | 10.2 | 2 | 2 | 1 kg–50 cm | 100/100 | 80 |
| D | 100 | 10.8 | 2 | 2 | 1 kg–50 cm | 100/100 | 130 |
| Control | | 9.4 | 2 | 2 | 1 kg–40 cm | 100/100 | 10 |

Example 3

A mixture of 100 parts by weight of the oil modified alkyd resin described in Example 1 and 150 parts by weight of fraction A prepared in the above Preparation Example 1 was applied as an under coat. The alkyd resin alone or a mixture of 100 parts by weight of the alkyd resin and 40 parts by weight of fraction C prepared in the above Preparation Example 2 were applied as a top coat. The coating films thus formed were, after drying in air for one week, subjected to water resistance testing. On testing, the coating film having a top coat of the alkyd resin alone was blistered and locally detached from the base within 10 minutes, while the coating film having a top coat of the composition in accordance with the present invention remained unchanged over 5 hours. Where both the under coat and top coat were formed of the alkyd resin alone, the coating film detached from the base within 5 minutes.

Example 4

A coating was prepared by incorporating 100 parts by weight of a boiled linseed oil, 0.1 part by weight of cobalt naphthenate and 100 parts by weight of fraction D prepared in the above Preparation Example 2 and was applied to a base. After drying in air for one week, the coating film was tested in the manner as described in Example 1. On testing, a coating film formed of the boiled linseed oil alone was blemished, while the coating film of the composition of the present invention remained unchanged.

What is claimed is:

1. An air-curing resin composition comprising a mixture of 100 parts by weight of a drying oil or an oil-modified alkyd resin and 5 to 250 parts by weight of a propylated polycyclic aromatic hydrocarbon containing on the average from 1 to 5 propyl groups per molecule, having a molecular weight of 240 to 600, a boiling range of 250 to 600° C., a specific gravity of 0.9 to 1.1, a viscosity of 3,000 to 50,000 cps., and a proton density in the aromatic ring (NMR) of 15–30%.

2. The composition of claim 1, wherein said propylated polycyclic aromatic hydrocarbon contains from 2 to 5 propyl groups.

3. The composition of claim 1, wherein said resin is selected from the group consisting of natural drying oils, oils derived from natural drying oils, and oil-modified alkyd resins.

4. The composition of claim 2, wherein said composition contains a curing agent.

5. The composition of claim 4, wherein said composition contains a solvent, a plasticizer, an anti-oxidant, a filler and a pigment.

6. The composition of claim 1, wherein said propylated polycyclic aromatic hydrocarbon has a boiling range of 350 to 600° C.

References Cited
UNITED STATES PATENTS
2,824,145   2/1958   McCall _____ 260—671

THEODORE MORRIS, Primary Examiner

U.S. Cl. X.R.

106—253; 260—33.6 R